(12) United States Patent
Vivanco et al.

(10) Patent No.: US 8,942,119 B1
(45) Date of Patent: Jan. 27, 2015

(54) DETERMINING A BURSTINESS PROFILE OF A WIRELESS COMMUNICATION SYSTEM

(75) Inventors: Daniel Vivanco, Reston, VA (US); Yu Zhou, Herndon, VA (US); Kyounghwan Lee, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 186 days.

(21) Appl. No.: 13/296,404

(22) Filed: Nov. 15, 2011

(51) Int. Cl.
*H04L 12/26* (2006.01)
*H04W 72/10* (2009.01)

(52) U.S. Cl.
CPC ..................... *H04W 72/10* (2013.01)
USPC ........................................................ 370/252

(58) Field of Classification Search
None
See application file for complete search history.

(56) References Cited

U.S. PATENT DOCUMENTS

| | | | |
|---|---|---|---|
| 5,805,576 A * | 9/1998 | Worley et al. | 370/337 |
| 6,665,521 B1 * | 12/2003 | Gorday et al. | 455/67.11 |
| 7,257,082 B2 | 8/2007 | Dugatkin | |
| 7,616,399 B1 * | 11/2009 | Chen et al. | 360/77.08 |
| 7,933,238 B2 * | 4/2011 | Sartori et al. | 370/328 |
| 2004/0257999 A1 * | 12/2004 | MacIsaac | 370/252 |
| 2008/0214182 A1 * | 9/2008 | Wang et al. | 455/423 |
| 2009/0047955 A1 * | 2/2009 | Frenger et al. | 455/436 |
| 2010/0069083 A1 | 3/2010 | Wei et al. | |
| 2010/0177653 A1 * | 7/2010 | Luo et al. | 370/252 |
| 2012/0115503 A1 * | 5/2012 | Lynch et al. | 455/456.1 |

* cited by examiner

*Primary Examiner* — Jeffrey M Rutkowski
*Assistant Examiner* — Hardikkumar Patel (57) ABSTRACT

Active wireless devices in communication with an access node of a wireless communication system are detected and prioritized, and a group of the active wireless devices is selected. Data is provided to each selected wireless device, a burstiness metric is received based on the provided data, and a burstiness profile of the wireless communication system is determined.

20 Claims, 6 Drawing Sheets

| WD# | Idle Time | Last Signal Strength Value | Assigned Priority |
|---|---|---|---|
| 1 | 0 sec | 4dB | 5 |
| 2 | 10 sec | 10dB | 4 |
| 3 | 100 sec | 24dB | 1 |
| 4 | 1000 sec | 24dB | 2 |
| 5 | 2000 sec | 24dB | 3 |

DETERMINING A BURSTINESS PROFILE OF A WIRELESS COMMUNICATION SYSTEM

TECHNICAL BACKGROUND

Data traffic in a communication network can be described as statistically self-similar. Observed characteristics of such data traffic include burstiness on multiple time scales, highly variable traffic, and as having heavy-tailed distributions of file sizes and corresponding transmission times. Observed data traffic patterns differ from observed voice traffic patterns, and commonly used voice traffic models typically do not accurately describe data traffic behavior.

Network performance degrades gradually with increasing self-similarity of data traffic. For example, the more self-similar the traffic, the longer the queue length. Under such circumstances heavy fluctuations in packet delay can arise, which can cause, among other things, jitter in data communication, which typically leads to deterioration of application performance. Determining the burstiness of a communication system is thus highly desirable for operators and managers of such systems. Common methodologies for measuring network utilization involved periodic sample measurements over time include, for example, measuring the average throughput at a network element, or between network elements, over a period time. Such methodologies cannot measure the burstiness of the samples within the analyzed time interval.

Overview

Active wireless devices in communication with an access node of a wireless communication system are detected, and the active wireless devices are prioritized according to prioritization criteria. A group of the active wireless devices is selected from among the plurality of active wireless devices. Data is provided to each selected wireless device in at least one modulation and coding scheme, and a burstiness metric is received based on the provided data. Based on the received burstiness metrics, a burstiness profile of the wireless communication system is determined.

DETAILED DESCRIPTION

In operation, to determine a burstiness profile of a wireless system, active wireless devices in communication with an access node of a wireless communication system are detected and prioritized according to prioritization criteria. From the detected active wireless devices, a subset of wireless devices is selected, data is provided to each selected wireless device in at least one modulation and coding scheme (MCS), and a burstiness metric is received based on the provided data. Data can be provided to a wireless device in more than one available MCS, and burstiness metrics can be received from the wireless device according to each MCS. Based on the received burstiness metrics, a burstiness profile of the wireless communication system is determined. The burstiness profile can include a burstiness profile according to each MCS.

Figure 1:
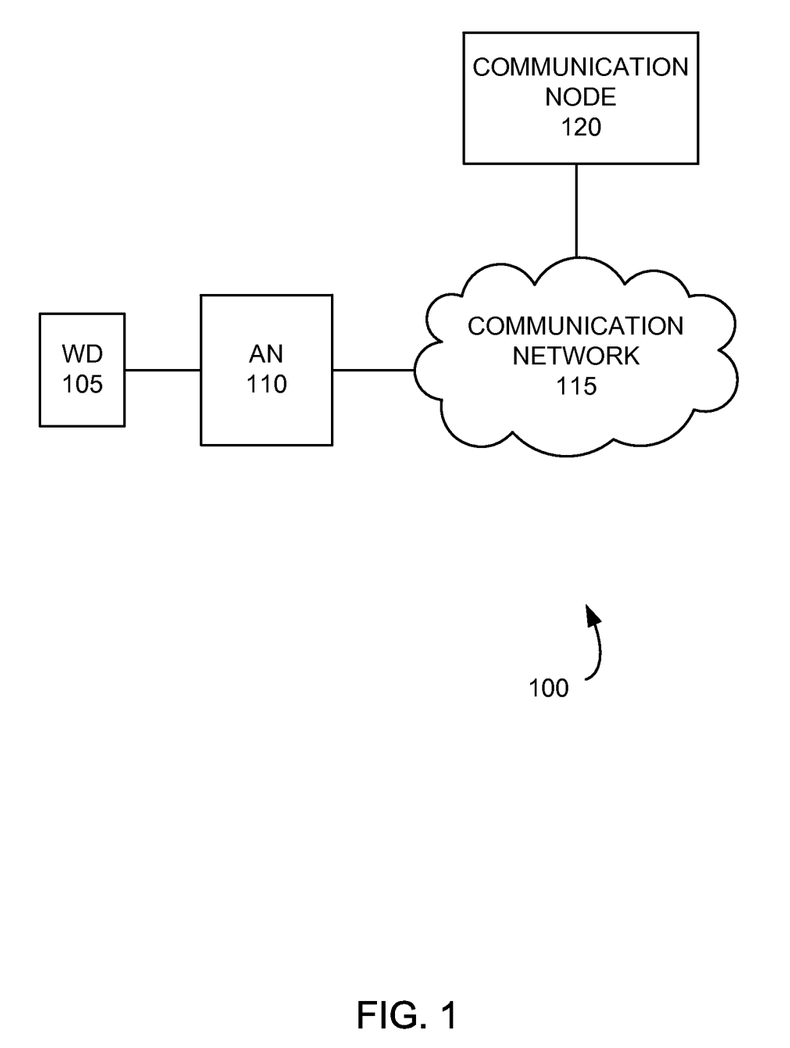
FIG. 1 illustrates an exemplary communication system.

FIG. 1 illustrates an exemplary communication system 100 comprising a wireless device 105, an access node 110, a communication network 115, and a communication node 120. Other network elements may be present in the communication system 100 to facilitate wireless communication but are omitted for clarity, such as gateways, routers, mobile switching centers, and location registers such as a home location register or visitor location register. Examples of a wireless device 105 include a telephone, a computer, a personal digital assistant, an internet access device, or other device capable of wireless communication, including combinations thereof. Access node 110 communicates with the wireless device 105, and can be for example a base transceiver station and an eNodeB device. Access node 110 can include a network element capable of performing a method of determining a burstiness profile of the wireless communication system. The network element can be a component of a base transceiver station, eNodeB device, or functional equivalent, or it can be another network element in communication with the base transceiver station or eNodeB device. In operation, closer location to the base transceiver station/eNodeB reduces an effect of congestion in other parts of the communication system 100.

Communication network 115 is a network or internetwork and is in communication with the access node 110. Communication node 120 is a network node which permits the wireless device 105 to register with a communication system, and is in communication with the communication network 115. Other network elements may be present to facilitate communication between the access node 110, the communication network 115, and the communication node 120 which are omitted for clarity, including additional processing nodes, routers, gateways, and physical and/or wireless data links for carrying data among the various network elements. The wireless device 105, the access node 110, the communication network 115, and the communication node 120 each communicate over wired or wireless communication links or combinations thereof. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Figure 2:
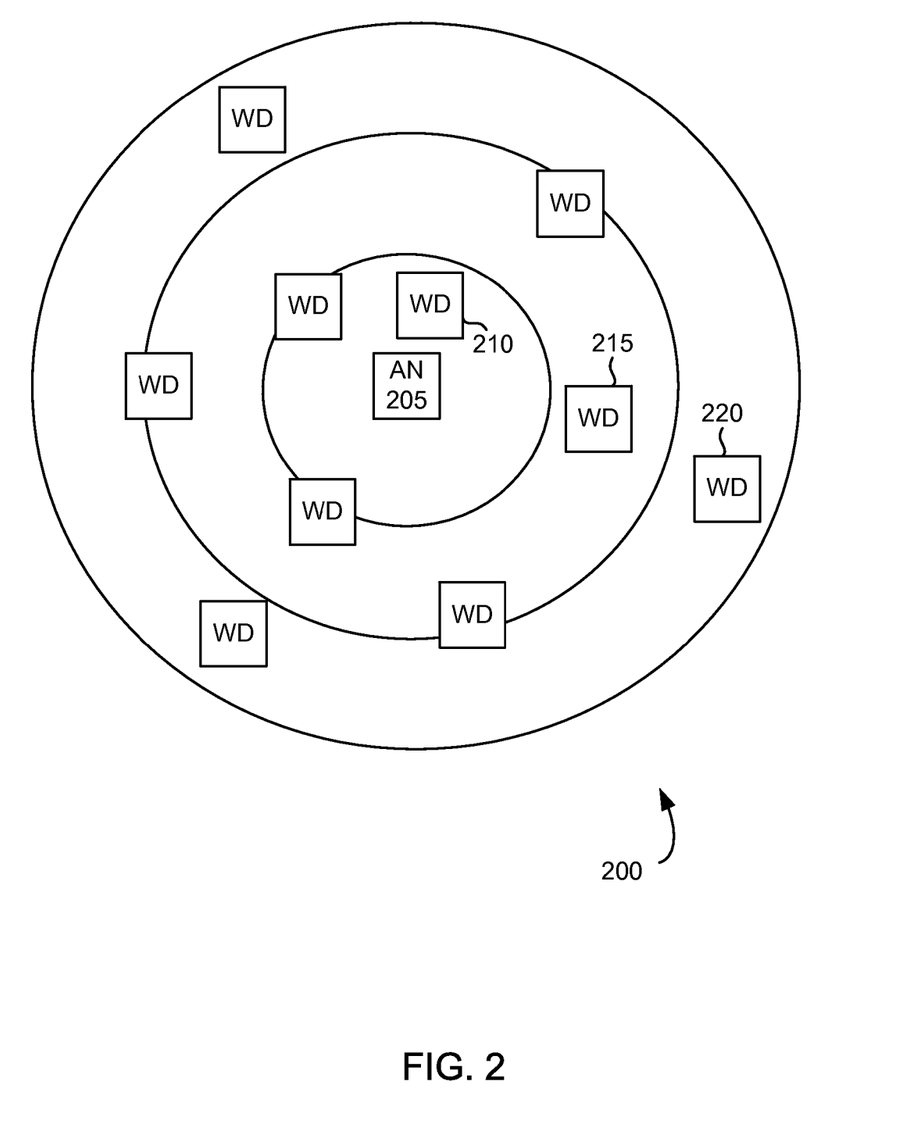
FIG. 2 illustrates an exemplary coverage area in a wireless communication system.

FIG. 2 illustrates an exemplary coverage area in a wireless communication system 200 comprising an access node 205 and a plurality of wireless devices in communication with the access node 205, including wireless devices 210, 215 and 220. Access node 205 can communicate with the wireless devices in its coverage are using numerous carriers, for example, a 2500 MHz carrier, a 1900 MHz carrier, and a 800 MHz carrier. On each carrier, access node 205 can employ various modulations schemes, such as QPSK, 16QAM, and 64QAM, each with varying error correction coding (a modulation and coding scheme, or MCS). Each carrier may have different characteristics, including coverage, availability, total capacity, and transmission schemes. Thus, the access node 205 can communicate with each wireless device in its coverage area using a variety of carriers and modulation and coding schemes. In addition, the access node 205 can adjust the carrier and/or the MCS used for communication with a wireless device based on changes in, among other things, the location of the wireless device relative to the access node, radio frequency conditions in the coverage area, signal strength and error rate reports which can be provided by the wireless device, data requirements of a wireless device (e.g., of an application being executed by a wireless device), and other factors. For example, the access node 205 may communicate with wireless device 210 using a 2500 MHz carrier and 64QAM MCS, with wireless device 215 using a 1900 MHz carrier and 16QAM MCS, and with wireless device 220 using a 800 MHz carrier and QPSK MCS. Furthermore, the selected carrier and/or MCS used with each wireless device can be adjusted dynamically.

Network performance degrades gradually with increasing self-similarity. For example, the more self-similar the traffic, the longer the queue length. Under such circumstances heavy fluctuations in packet delay can arise, which can cause, among other things, jitter in data communication, which typically leads to deterioration of application performance. Determining the burstiness of a communication system is thus highly desirable for operators and managers of such systems. The degree of self-similarity is commonly measured in terms of the Hurst parameter (H). In the context of network traffic, H is used to measure the traffic "burstiness" and it is a function of, among other things, network load and the type of applications being run in communication with a network. One way of measuring traffic burstiness through the H parameter is by means of collecting data packets of a given flow at the receiver and generating the autocorrelation distribution of the packet inter-arrival time. Estimating the degree of traffic burstiness on a wireless communication network is yet more complex owing at least in part to the use of adaptive modulation coding. Thus, in a wireless communication network, the degree of traffic burstiness may also vary based on MCS used to communicate with a wireless device.

Figure 3:
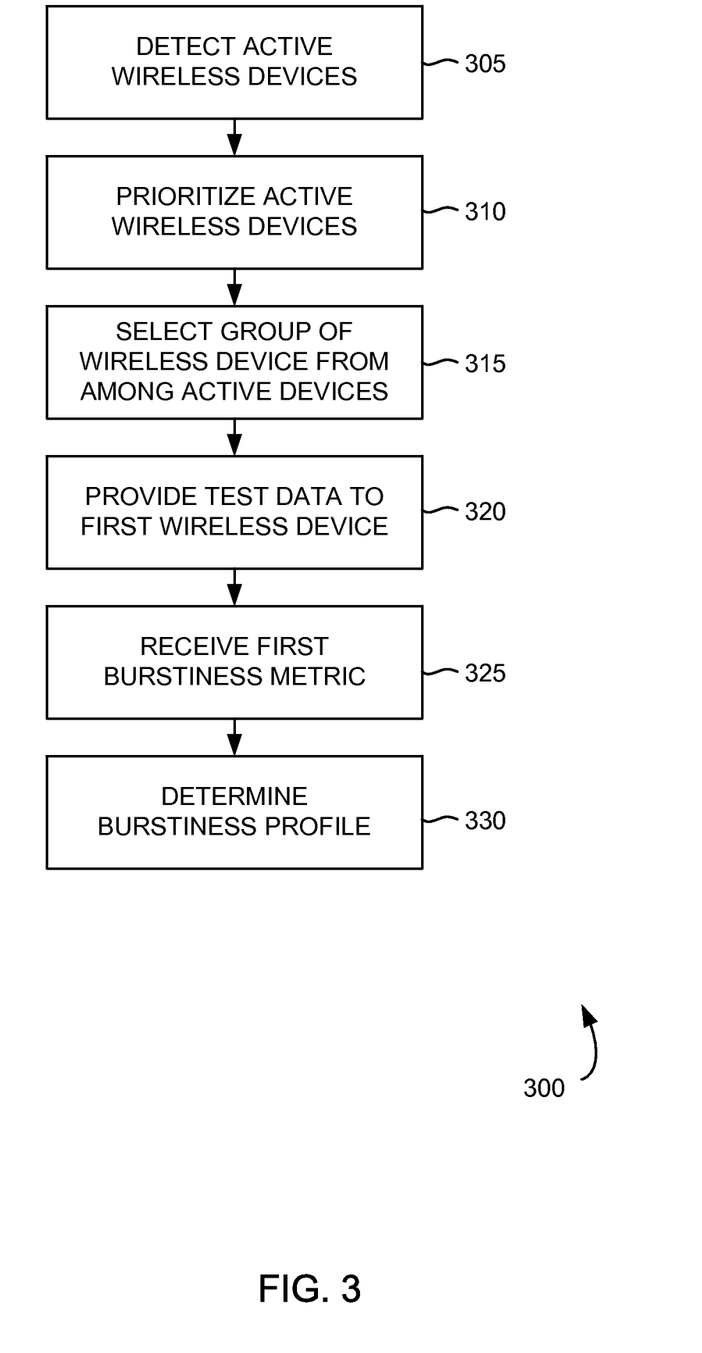
FIG. 3 illustrates an exemplary method of determining a burstiness profile of a wireless communication system.

FIG. 3 illustrates an exemplary method 300 of determining a burstiness profile of a wireless communication system. In operation 305, wireless devices which are in communication with, or which have recently been in communication with, an access node are detected. For example, a list of wireless devices which are in a coverage area of an access node can be determined. The list can include, for example, wireless devices which have communicated with the access node within a predetermined period of time, such as the wireless devices illustrated in FIG. 2 in communication with the access node 205. The period of time can be determined to be of such length that it is reasonable to conclude that wireless devices which have not communicated within the period of time are no longer in communication with the access node (e.g., they have left the coverage area, or they have been powered off, or local environmental conditions are so severe as to prevent the wireless device from communicating with the access node).

In operation 310, the active wireless devices are prioritized. In an example, a priority value is assigned to each active wireless device based on current information regarding each wireless device. For example, each of the wireless devices illustrated in FIG. 2 can be assigned a priority. Wireless device information can include a duration of time since the wireless device was actively communicating with the access node, a signal strength, and a demand from the wireless device (for example, a data demand, such as from an application running on the wireless device). A higher priority can be given to a wireless device which is in an idle mode, i.e., not actively communicating with the access node, to avoid disruption of wireless device data transmission and/or reception.

Higher priority can also be assigned to a wireless device which reports a strong signal strength. In addition, higher priority can be given to a wireless device which has apparently low mobility, i.e., appears unlikely to leave the coverage area.

In operation 315, from the prioritized wireless devices, a group of wireless devices is selected (for example, wireless devices 210, 215 and 220), and data is provided to a first wireless device (for example, wireless device 210) from among the selected group of wireless devices (operation 320). The data provided has known characteristics, for example, packet size, interpacket gaps, and data stream duration. The characteristics of the data can be determined dynamically based on network conditions to reduce a substantial addition to network congestion. In one example, the data provided to the first wireless device is test data. The data provided can be in a first MCS. In operation 325, a first burstiness metric is received from the wireless device based on the data provided to the wireless device. The first burstiness metric can be, for example, a Hurst value. Based on the received burstiness metric, a burstiness profile of the wireless communication system can be determined (operation 330). Thus, traffic burstiness in the wireless communication system can be determined according to the MCS.

Figure 4A:
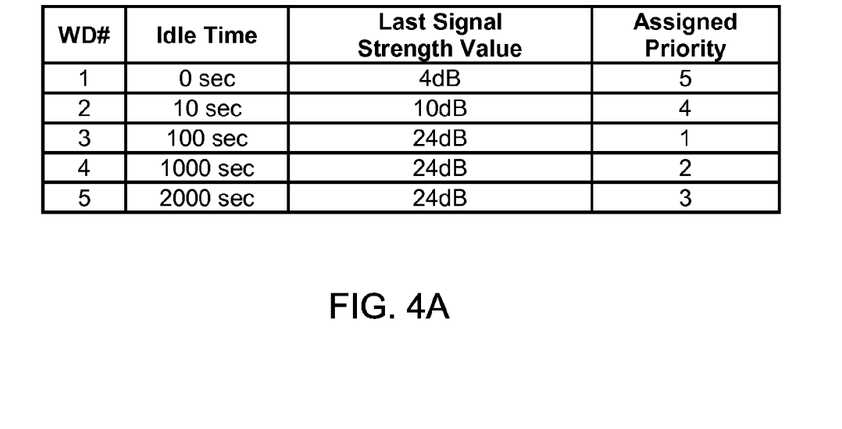
FIG. 4A illustrates an exemplary table of wireless devices and assigned priorities.

FIG. 4A illustrates an exemplary table of wireless devices and assigned priorities. The table illustrates wireless device information related to five wireless devices WD1-WD5. The prioritization of the wireless devices can be based on criteria including a signal strength comparison, an idle time comparison, and a low mobility determination. For example, as illustrated in FIG. 4A, the wireless device information includes a duration of time since the wireless device was actively communicating with the access node, a signal strength value reported by the wireless device, and an assigned priority (where 1 is the highest priority and 5 is the lowest). A higher priority can be given to a wireless device which is in an idle mode, i.e., not actively communicating with the access node, to avoid disruption of wireless device data transmission and/or reception. Higher priority can also be assigned to a wireless device which reports a strong signal strength. In addition, higher priority can be given to a wireless device which has apparently low mobility, i.e., appears unlikely to leave the coverage area. Thus, WD3 is assigned the highest priority because it actively communicated 100 s ago with the access node, and based on the idle time WD3 is likely able to communicate with the access node but not actively communicating with the access node (i.e., WD3 is likely idle). In addition, based on the idle time, WD3 is likely to have a low mobility, and so is likely to be able to communicate with the wireless device. WD1 is assigned the lowest priority in part because it is actively communicating with the wireless device (the idle time is 0 s), and in part because its last reported signal strength value was relatively low compared to the other wireless devices. WD5 is assigned a priority of 3 because, although its last reported signal strength was high (24 dB), the amount of time since WD5 last actively communicated with the access node (2000 s) indicates that it may be unable to communicate with the access node. In addition, based on the idle time the mobility of WD5 may be high, and so even if WD5 is found to be able to communicate with the access node, WD5 may provide unreliable information due to its high mobility.

Figure 4B:
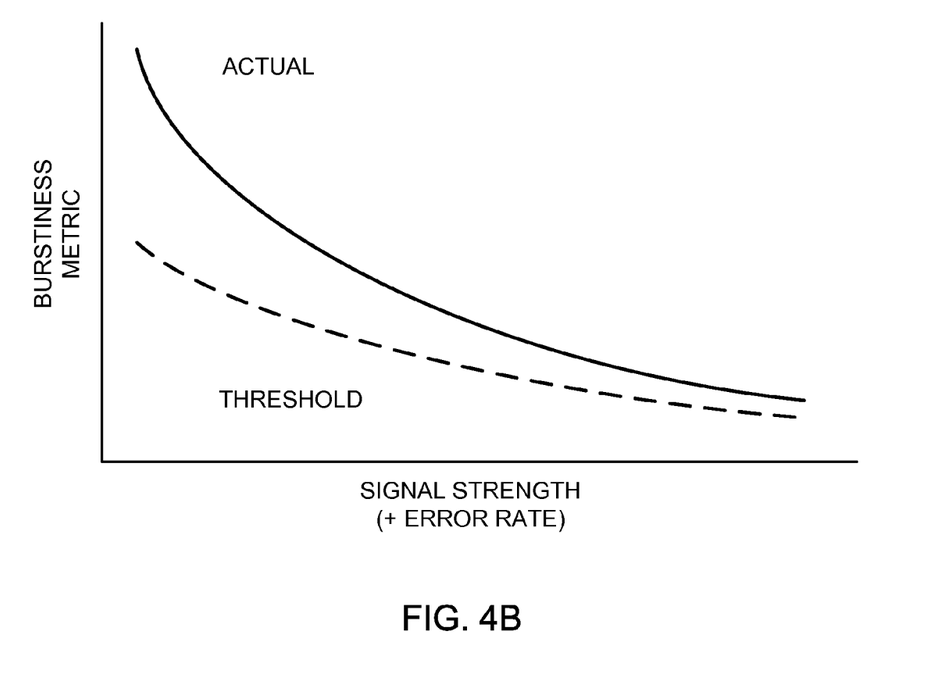
FIG. 4B illustrates an exemplary comparison of burstiness metrics.

FIG. 4B illustrates an exemplary comparison of burstiness metrics. Data can be provided to a plurality of wireless devices, and burstiness metrics can be received from wireless devices, in sufficient numbers to generate a robust distribution of burstiness metrics. The received burstiness metrics are associated with signal strength measurements reported by the wireless devices. In addition, a reported error rate can also be associated with the received burstiness metrics. Based on the received burstiness metrics, the received signal strength reports, and possibly the reported error rates, a burstiness profile can be determined. As illustrated in FIG. 4B, a burstiness profile determined from measured values ("actual") can be compared to an ideal burstiness profile ("threshold") which corresponds, for example, to a communication network exhibiting an ideal level of network congestion. The difference between the actual burstiness profile and the threshold profile is used to estimate the traffic burstiness of the communication network. In addition, as will be described below, data can be provided to a wireless device in different MCSs, and burstiness metrics can be received from the wireless device for data provided in each MCS. In such case, the difference between the actual burstiness profile and the threshold profile is used to estimate the traffic burstiness of the communication network according to the MCS. In addition, the difference between the actual burstiness profile and the threshold profile can be used in network resource and traffic management, for example, in shaping traffic in at least one network element, to improve latency, increase usable bandwidth, or to provide a predetermined network performance level or range of performance.

Figure 5:
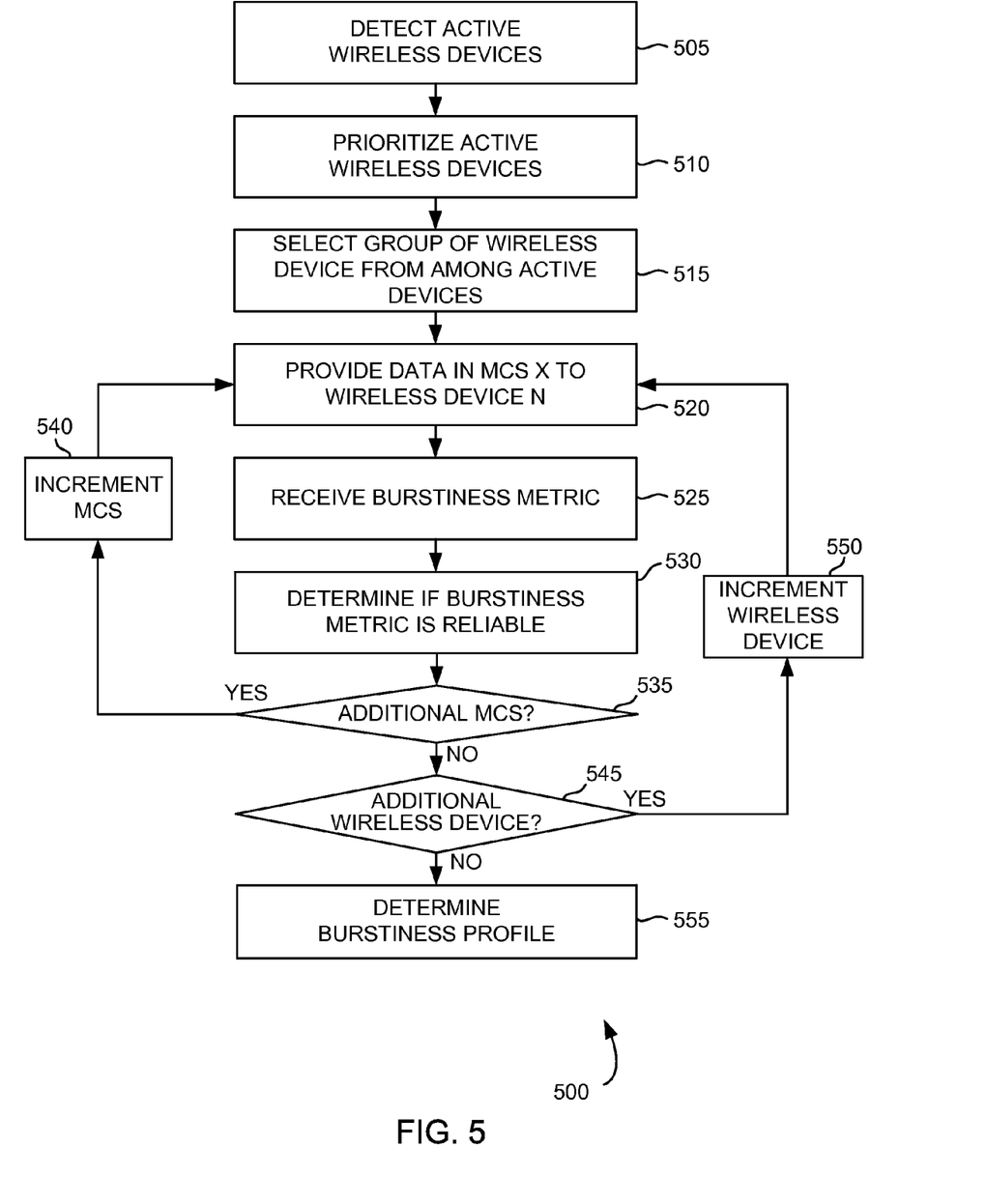
FIG. 5 illustrates another exemplary method of determining a burstiness profile of a wireless communication system.

FIG. 5 illustrates another exemplary method 500 of determining a burstiness profile of a wireless communication system. In operation 505, wireless devices which are in communication with, or which have recently been in communication with, an access node are detected. For example, a list of wireless devices which are in a coverage area of an access node can be determined. The list can include, for example, wireless devices which have communicated with the access node within a predetermined period of time, such as the wireless devices illustrated in FIG. 2 in communication with the access node 205. The period of time can be determined to be of such length that it is reasonable to conclude that wireless devices which have not communicated within the period of time are no longer in communication with the access node (e.g., they have left the coverage area, or they have been powered off, or local environmental conditions are so severe as to prevent the wireless device from communicating with the access node).

In operation 510, the active wireless devices are prioritized. In an example, a priority value is assigned to each active wireless device based on current information regarding each wireless device. For example, each of the wireless devices illustrated in FIG. 2 can be assigned a priority. Wireless device information can include a duration of time since the wireless device was actively communicating with the access node, a signal strength, and a demand from the wireless device (for example, a data demand, such as from an application running on the wireless device). A higher priority can be given to a wireless device which is in an idle mode, i.e., not actively communicating with the access node, to avoid disruption of wireless device data transmission and/or reception. Higher priority can also be assigned to a wireless device which reports a strong signal strength. In addition, higher priority can be given to a wireless device which has apparently low mobility, i.e., appears unlikely to leave the coverage area.

In operation 515, from the prioritized wireless devices, a group of wireless devices is selected (for example, wireless devices 210, 215 and 220). In an embodiment, the selected wireless devices can be sent a message instructing them to prepare to receive data in accordance with the method 500. In operation 520, data is provided to the selected wireless devices in order of highest-to-lowest priority (for example, with reference to FIG. 4A, wireless device WD3 first, WD4 second, etc.). In addition, data is provided to a wireless device in a selected MCS. For example, data can be provided to WD3 in 64QAM MCS. In operation 525, a burstiness metric is received from the selected wireless device based on the data provided in the selected MCS. The burstiness metric can be, for example, a Hurst value. In addition, a signal strength indicator and/or a packet error rate can also be included in the burstiness metric sent by the wireless device. A signal strength indicator can be, for example, a reference signal receive power (RSRP), or a carrier to interference plus noise ratio (CINR). A packet error rate can be, for example, an automatic repeat request (ARQ) or a hybrid automatic repeat request (HARQ).

In operation 530, it is determined whether the received burstiness metric is reliable. The determination of reliability can be based at least in part on the received packet error rate. If the packet error rate indicates that burstiness is being introduced by the MCS, for example, if there is a high ARQ or HARQ rate), then the received burstiness metric will be discarded. If the received burstiness metric is determined to be reliable, then in operation 535 it will be determined whether additional MCSs remain for testing. If there are remaining or additional MCSs for which data has not been provided to the selected wireless device (operation 535-YES), then in operation 540 the next MCS is selected and data is provided to the selected wireless device in the next MCS (operation 520).

If no additional MCSs remain, then it is determined whether wireless devices remain in the selected group of wireless devices. If additional wireless devices remain, then the next wireless device is selected (operation 550), data is provided to the next wireless device in an MCS (operation 520), and a burstiness metric is received from the next wireless device related to the provided data in the selected MCS (operation 525). For example, with reference to FIG. 4A, wireless device WD4 with assigned priority 2 is selected and is provided with data in an MCS, and a burstiness metric is received from WD4. When no wireless devices remain in the selected group which have not been provided data (operation 545—NO), then based on the received burstiness metrics, a burstiness profile of the wireless communication system can be determined for each MCS (operation 555).

In an embodiment, the operations of method 500 can be interrupted based on changes in conditions. For example, a high priority is placed on wireless devices which are idle and which have low mobility, so if the access node receives an indication that the wireless device is no longer active (for example, if the wireless device initiates or receives a call, or starts and application which sends and/or receives data), then the method 500 can be interrupted to avoid interference with the wireless device activity. Similarly, if the access node receives an indication that the mobility of the wireless device has increased, the method 500 can be interrupted. In such case, the next wireless device in the selected group will be used in the method.

Figure 6:
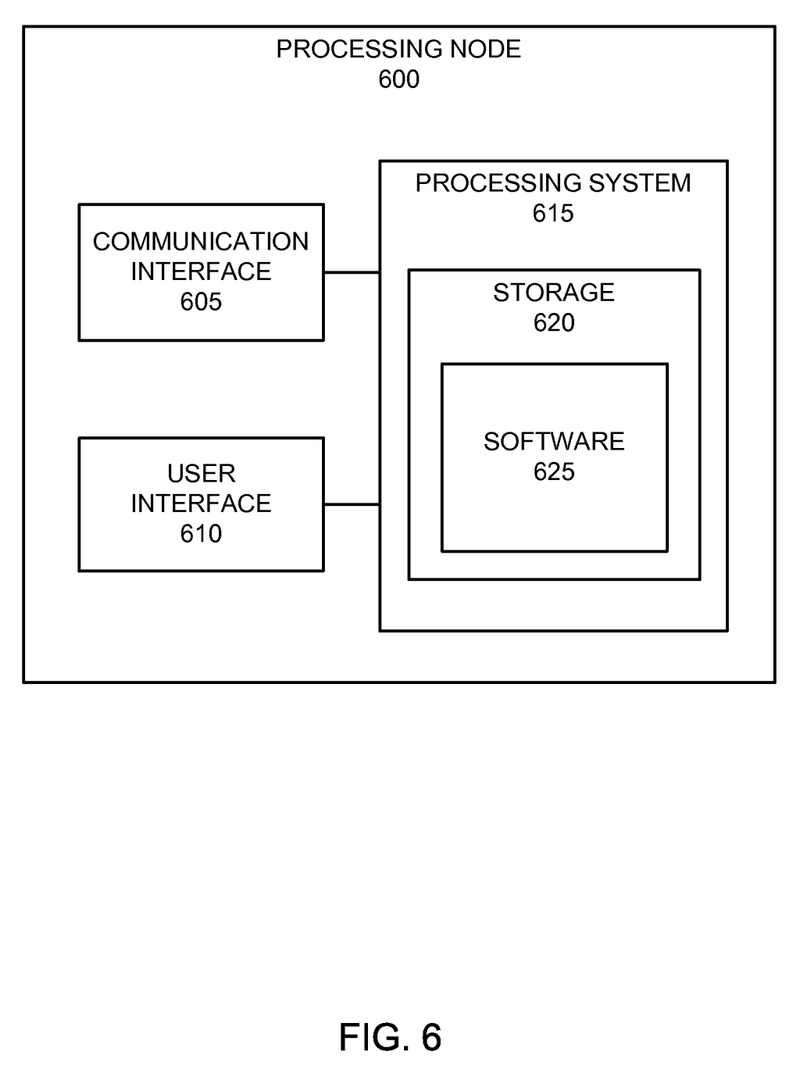
FIG. 6 illustrates an exemplary processing node.

FIG. 6 illustrates an exemplary processing node 600 comprising a communication interface 605 and a user interface 610, each in communication with a processing system 615. Processing node 600 can be configured to perform a method of determining a burstiness profile of a wireless communication system. Processing system 615 can include storage 620. Storage 620 comprises a disk drive, flash drive, memory circuitry, or other memory device. Storage 620 can store software 625 which is used in the operation of the processing node 600. Software 625 may include an operating system, utilities, drivers, network interfaces, applications, or some other type of software. User interface 610 permits a user to configure and control the operation of the processing node 600.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of determining a burstiness profile of a wireless communication system, comprising:
   detecting a plurality of active wireless devices in communication with an access node;
   prioritizing the plurality of active wireless devices in a priority order according to prioritization criteria and selecting a group of wireless devices from among the prioritized plurality of active wireless devices, wherein the prioritization criteria comprises a comparison of a duration of time since the plurality of active wireless devices actively communicated with the access node, a signal strength comparison, and a low mobility determination;
   providing data in a first modulation and coding scheme (MCS) to a first wireless device of the selected group;
   receiving a first burstiness metric based on the data from the first wireless device; and
   determining a burstiness profile of the wireless communication system based on the first burstiness metric.

2. The method of claim 1, further comprising:
   providing data in a second MCS to the first wireless device after providing data in the first MCS to the first wireless device.

3. The method of claim 1, further comprising:
   providing data in the first MCS to a second wireless device of the selected group.

4. The method of claim 3, further comprising:
   providing data in a second MCS to the second wireless device after providing data in the first MCS to the second wireless device.

5. The method of claim 3, further comprising:
   receiving a second burstiness metric based on the data from the second wireless device.

6. The method of claim 5, wherein determining a burstiness profile of the wireless communication system further comprises:
   determining a burstiness profile of the wireless communication system based on the first burstiness metric and the second burstiness metric.

7. The method of claim 1, wherein burstiness data comprises a determination of data burstiness, a signal strength measurement, and a data error rate.

8. The method of claim 1, wherein receiving a burstiness metric further comprises:
   receiving a burstiness metric from the selected wireless device and determining a signal strength measurement and a data error rate from the burstiness metric.

9. The method of claim 1, further comprising:
   determining whether to discard the burstiness data based on at least one of the burstiness metric and the data error rate.

10. A system for determining a burstiness profile of a wireless communication system, comprising:
    an interface to send and receive signals from a plurality of wireless devices; and
    a processor configured to
        detect a plurality of active wireless devices in communication with an access node,
        prioritize the plurality of active wireless devices in a priority order according to prioritization criteria and selecting a group of wireless devices from among the plurality of active wireless devices, wherein the prioritization criteria comprises a comparison of a duration of time since the plurality of active wireless devices actively communicated with the access node, a signal strength comparison, and a low mobility determination,
        provide data in a first modulation and coding scheme (MCS) to a first wireless device of the selected group,
        receive a first burstiness metric based on the data from the first wireless device, and
        determine a burstiness profile of the wireless communication system based on the first burstiness metric.

11. The system of claim 10, wherein the processor is further configured to:
    provide data in a second MCS to the first wireless device after providing data in the first MCS to the first wireless device.

12. The system of claim 10, wherein the processor is further configured to:
    provide data in the first MCS to a second wireless device of the selected group.

13. The system of claim 12, wherein the processor is further configured to:
    provide data in a second MCS to the second wireless device after providing data in the first MCS to the second wireless device.

14. The system of claim 12, wherein the processor is further configured to:
    receive a second burstiness metric based on the data from the second wireless device.

15. The system of claim 14, wherein the processor is further configured to:
    determine a burstiness profile of the wireless communication system based on the first burstiness metric and the second burstiness metric.

16. The system of claim 10, wherein burstiness data comprises a determination of data burstiness, a signal strength measurement, and a data error rate.

17. The system of claim 10, wherein the processor is further configured to:
    receive a burstiness metric from the selected wireless device and a signal strength measurement and a data error rate from an access node in communication with the selected wireless device.

18. A method of determining a burstiness profile of a wireless communication system, comprising:
    detecting a plurality of active wireless devices in communication with an access node;
    prioritizing the plurality of active wireless devices in a priority order according to prioritization criteria and selecting a group of wireless devices from among the plurality of active wireless devices, wherein the prioritization criteria comprises a comparison of a duration of time since the plurality of active wireless devices actively communicated with the access node, a signal strength comparison, and a low mobility determination;
    providing data in a first modulation and coding scheme (MCS) to a first wireless device of the selected group;

providing data in a second MCS to the first wireless device after providing data in the first MCS to the first wireless device;

providing data in the first MCS to a second wireless device of the selected group;

providing data in a second MCS to the second wireless device after providing data in the first MCS to the second wireless device;

receiving a first burstiness metric based on the data from the first wireless device and a second burstiness metric based on the data from the second wireless device; and determining a burstiness profile of the wireless communication system based on the first burstiness metric and the second burstiness metric.

19. The method of claim 1, wherein the comparison of the duration of time since the wireless devices actively communicated with the access node further comprises determining when an idle time is above a first threshold duration of time and is below a second threshold duration of time.

20. The method of claim 18, wherein the comparison of the duration of time since the wireless devices actively communicated with the access node further comprises determining when an idle time is above a first threshold duration of time and is below a second threshold duration of time.

* * * * *